US010372968B2

(12) United States Patent
Aghamohammadi et al.

(10) Patent No.: US 10,372,968 B2
(45) Date of Patent: Aug. 6, 2019

(54) OBJECT-FOCUSED ACTIVE THREE-DIMENSIONAL RECONSTRUCTION

(71) Applicant: QUALCOMM Incorporated, San Diego, CA (US)

(72) Inventors: Aliakbar Aghamohammadi, San Diego, CA (US); Seyed Hesameddin Najafi Shoushtari, San Diego, CA (US); Regan Blythe Towal, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 15/192,857

(22) Filed: Jun. 24, 2016

(65) Prior Publication Data

US 2017/0213070 A1    Jul. 27, 2017

Related U.S. Application Data

(60) Provisional application No. 62/286,032, filed on Jan. 22, 2016.

(51) Int. Cl.

| | |
|---|---|
| ***G06K 9/00*** | (2006.01) |
| ***G06T 7/60*** | (2017.01) |
| ***G06K 9/46*** | (2006.01) |
| ***G06K 9/52*** | (2006.01) |
| ***B25J 9/16*** | (2006.01) |
| ***G05D 1/00*** | (2006.01) |

(Continued)

(52) U.S. Cl.

CPC .......... *G06K 9/00201* (2013.01); *B25J 9/163* (2013.01); *B25J 9/1697* (2013.01); *G05D 1/0088* (2013.01); *G06K 9/4604* (2013.01); *G06K 9/52* (2013.01); *G06T 7/13* (2017.01); *G06T 7/529* (2017.01); *G06T 7/60* (2013.01); *Y10S 901/47* (2013.01); *Y10S 901/50* (2013.01)

(58) Field of Classification Search

None

See application file for complete search history.

(56) References Cited

U.S. PATENT DOCUMENTS

| | | | |
|---|---|---|---|
| 8,711,206 B2 | 4/2014 | Newcombe et al. | |
| 9,102,055 B1 | 8/2015 | Konolige et al. | |
| 9,880,553 B1 * | 1/2018 | Hoffmann ............ | G05D 1/0038 |

(Continued)

OTHER PUBLICATIONS

Scott, W. R., Roth, G., & Rivest, J. F. (2003). View planning for automated three-dimensional object reconstruction and inspection. ACM Computing Surveys (CSUR), 35(1), 64-96.*

(Continued)

*Primary Examiner* — Samah A Beg

(74) *Attorney, Agent, or Firm* — Seyfarth Shaw LLP

(57) ABSTRACT

A method for guiding a robot equipped with a camera to facilitate three-dimensional (3D) reconstruction through sampling based planning includes recognizing and localizing an object in a two-dimensional (2D) image. The method also includes computing 3D depth maps for the localized object. A 3D object map is constructed from the depth maps. A sampling based structure is grown around the 3D object map and a cost is assigned to each edge of the sampling based structure. The sampling based structure may be searched to determine a lowest cost sequence of edges that may, in turn be used to guide the robot.

20 Claims, 10 Drawing Sheets

(51) Int. Cl.
*G06T 7/529* (2017.01)
*G06T 7/13* (2017.01)

(56) References Cited

U.S. PATENT DOCUMENTS

| | | | | |
|---|---|---|---|---|
| 10,003,787 | B1 * | 6/2018 | Wan | G06T 7/12 |
| 2004/0073337 | A1 * | 4/2004 | McKee | G05D 1/0251 700/245 |
| 2009/0290758 | A1 * | 11/2009 | Ng-Thow-Hing | G06T 7/73 382/106 |
| 2010/0315412 | A1 * | 12/2010 | Sinha | G06T 7/0065 345/419 |
| 2012/0256906 | A1 * | 10/2012 | Ross | G06T 15/205 345/419 |
| 2012/0287247 | A1 | 11/2012 | Stenger et al. | |
| 2013/0016098 | A1 * | 1/2013 | Addessi | G06T 19/20 345/420 |
| 2013/0141433 | A1 * | 6/2013 | Astrand | G06T 7/50 345/420 |
| 2013/0325244 | A1 * | 12/2013 | Wang | G05D 1/028 701/26 |
| 2014/0118494 | A1 * | 5/2014 | Wu | G06T 7/20 348/44 |
| 2014/0146045 | A1 * | 5/2014 | McGuire | G06T 15/405 345/422 |
| 2015/0091899 | A1 | 4/2015 | Grangetto et al. | |
| 2015/0294473 | A1 | 10/2015 | Michot et al. | |
| 2016/0005213 | A1 * | 1/2016 | Lecocq | G06T 15/60 345/419 |
| 2016/0232706 | A1 * | 8/2016 | Herman | G06T 17/20 |
| 2017/0004406 | A1 * | 1/2017 | Aghamohammadi | G06N 5/045 |
| 2017/0157769 | A1 * | 6/2017 | Aghamohammadi | B25J 9/1664 |
| 2017/0160747 | A1 * | 6/2017 | Aghamohammadi | G05D 1/0251 |
| 2017/0161946 | A1 * | 6/2017 | Aghamohammadi | G06T 17/05 |
| 2017/0165835 | A1 * | 6/2017 | Agarwal | B25J 9/1666 |
| 2017/0168488 | A1 * | 6/2017 | Wierzynski | G05D 1/0061 |
| 2017/0193830 | A1 * | 7/2017 | Fragoso | G08G 5/0069 |
| 2018/0012370 | A1 * | 1/2018 | Aghamohammadi | G06T 7/55 |
| 2018/0074505 | A1 * | 3/2018 | Lv | G05D 1/0214 |
| 2018/0161986 | A1 * | 6/2018 | Kee | G06K 9/00664 |
| 2018/0189565 | A1 * | 7/2018 | Lukierski | G06T 7/579 |
| 2018/0217614 | A1 * | 8/2018 | Salas-Moreno | B64C 39/024 |
| 2018/0247451 | A1 * | 8/2018 | Blumer | G06T 17/00 |
| 2018/0302614 | A1 * | 10/2018 | Toksvig | G06K 9/6269 |
| 2018/0322646 | A1 * | 11/2018 | Matthies | G06T 7/579 |

OTHER PUBLICATIONS

Forster, Christian, et al. "Continuous on-board monocular-vision-based elevation mapping applied to autonomous landing of micro aerial vehicles." 2015 IEEE International Conference on Robotics and Automation (ICRA). IEEE, 2015. (Year: 2015).*

Agha-Mohammadi A., et al., "FIRM: Sampling-based feedback motion-planning under motion uncertainty and imperfect measurements," The International Journal of Robotics Research, Nov. 15, 2013, pp. 1-37.

Prentice S., et al., "The Belief Roadmap: Efficient Planning in Belief Space by Factoring the Covariance," The International Journal of Robotics Research 28.11-12, 2009, pp. 1448-1465.

Anonymous: "3D Reconstruction from Multiple Images—Wikipedia, the Free Encyclopedia", Feb. 9, 2012 (Feb. 9, 2012), XP05511 0940, Retrieved from the Internet: URL:http://en.wikipedia.org/w/index.php?title=3D_reconstruction_from_multiple_images&oldid=475965681.

Bircher A., et al., "Structural Inspection Path Planning Via Iterative Viewpoint Resampling with Application to Aerial Robotics", 2015 IEEE International Conference on Robotics and Automation (ICRA), May 1, 2015 (May 1, 2015), XP055346156, pp. 6423-6430.

International Search Report and Written Opinion—PCT/US2016/068443—ISA/EPO—Mar. 27, 2017.

Lot B.E., et al., "Three-Dimensional Coverage Planning for an Underwater Inspection Robot", International Journal of Robotics Research, vol. 32, No. 9-10, Aug. 1, 2013, XP055346159, pp. 1048-1073.

* cited by examiner

OBJECT-FOCUSED ACTIVE THREE-DIMENSIONAL RECONSTRUCTION

CROSS-REFERENCE TO RELATED APPLICATION

The present application claims the benefit of U.S. Provisional Patent Application No. 62/286,032, filed on Jan. 22, 2016 and titled "OBJECT-FOCUSED ACTIVE THREE-DIMENSIONAL RECONSTRUCTION," the disclosure of which is expressly incorporated by reference herein in its entirety.

BACKGROUND

Field

Certain aspects of the present disclosure generally relate to machine learning and, more particularly, to improving systems and methods of object-focused three-dimensional reconstruction and motion planning.

Background

It is desirable for autonomous systems, such as robots, to have the ability to make decisions in view of uncertainty. For example, when operating in an unknown environment, it is also desirable, in some cases, to locate and identify certain objects within the environment. Furthermore, it may desirable to determine a plan for controlling the robot to interact with certain objects in the environment. However, determining such a plan is computationally intensive and expensive.

SUMMARY

In an aspect of the present disclosure, a method for guiding a robot equipped with a camera to facilitate three-dimensional (3D) reconstruction through sampling based planning is presented. The method includes recognizing and localizing an object in a two-dimensional (2D) image. The method also includes computing a plurality of 3D depth maps for the localized object and constructing a 3D object map from the depth maps. The method further includes growing a sampling based structure around the 3D object map and assigning a cost to each edge of the sampling based structure. Additionally, the method includes searching the sampling based structure to determine a lowest cost sequence of edges and guiding the robot based on the searching.

In another aspect of the present disclosure, an apparatus for guiding a robot equipped with a camera to facilitate three-dimensional (3D) reconstruction through sampling based planning is presented. The apparatus includes a memory and at least one processor. The one or more processors are coupled to the memory and configured to recognize and localize an object in a two-dimensional (2D) image. The processor(s) is(are) also configured to compute 3D depth maps for the localized object and to construct a 3D object map from the depth maps. The processor(s) is(are) further configured to grow a sampling based structure around the 3D object map and to assign a cost to each edge of the sampling based structure. Additionally, the processor(s) is(are) configured to search the sampling based structure to determine a lowest cost sequence of edges and to guide the robot based on the search.

In yet another aspect of the present disclosure, an apparatus for guiding a robot equipped with a camera to facilitate three-dimensional (3D) reconstruction through sampling based planning is presented. The apparatus includes means for recognizing and localizing an object in a two-dimensional (2D) image. The apparatus also includes means for computing 3D depth maps for the localized object and means for constructing a 3D object map from the depth maps. The apparatus further includes means for growing a sampling based structure around the 3D object map and means for assigning a cost to each edge of the sampling based structure. Additionally, the apparatus includes means for searching the sampling based structure to determine a lowest cost sequence of edges and means for guiding the robot based on the search.

In still another aspect of the present disclosure, a non-transitory computer readable medium is presented. The non-transitory computer readable medium has encoded thereon program code for guiding a robot equipped with a camera to facilitate three-dimensional (3D) reconstruction through sampling based planning. The program code is executed by a processor and includes program code to recognize and localize an object in a two-dimensional (2D) image. The program code also includes program code to compute 3D depth maps for the localized object and to construct a 3D object map from the depth maps. The program code further includes program code to grow a sampling based structure around the 3D object map and to assign a cost to each edge of the sampling based structure. Additionally, the program code includes program code to search the sampling based structure to determine a lowest cost sequence of edges and to guide the robot based on the search.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
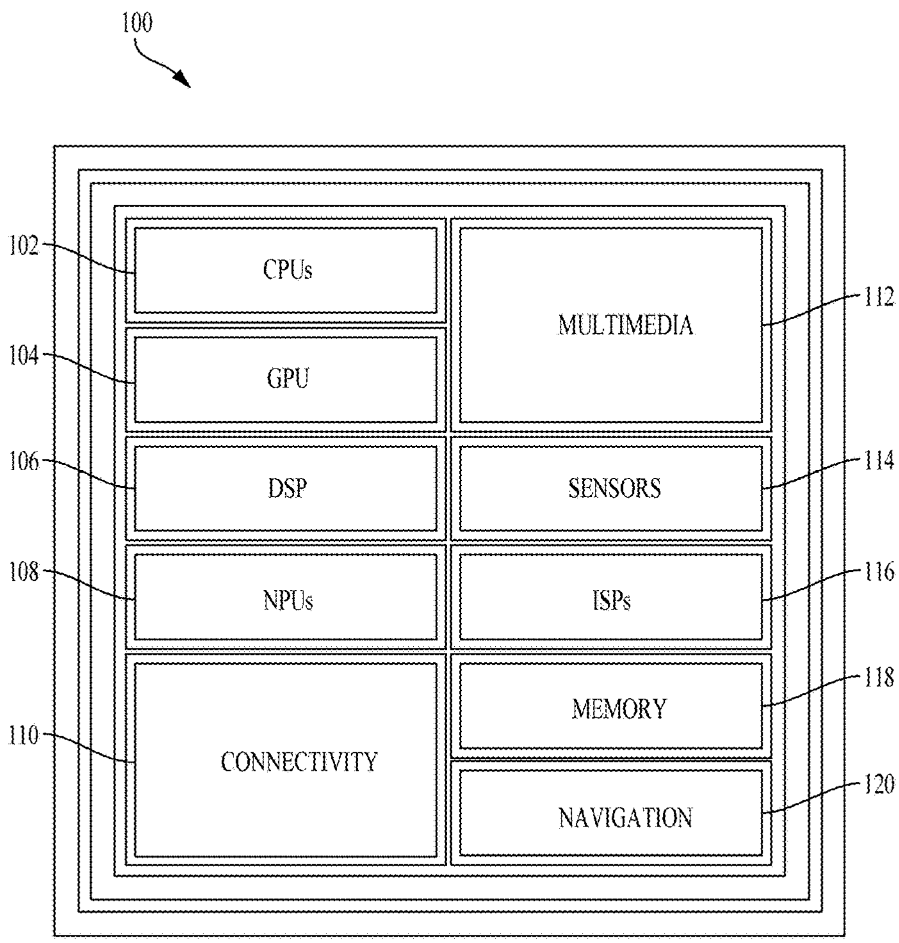
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

3D Model Reconstruction

Aspects of the present disclosure are directed to systems and methods for improved 3D model reconstruction. In one exemplary aspect, 3D model reconstruction may be employed in the context of motion planning for an autonomous robot or other agent (e.g., manipulators, drones, ground mobile robots, surface vehicles (e.g., boats), underwater vehicles, autonomous cars, and the like). In this context, it may be desirable to determine how to move a robot to interact with or contact an object in an environment. For instance, a robot may be configured with a camera. The camera may be positioned within or about the grasper or hand of the robot. The location and number of cameras is merely exemplary and the robot or other agent may also be configured with multiple cameras at various locations. In this configuration, the accuracy of a reconstruction mechanism may be characterized with respect to the motion of the camera. This information may be incorporated into a planning framework to calculate a camera trajectory that may produce improved or highly accurate surface reconstruction of an object of interest.

The desired objective may be to grasp an object (e.g., a cup) with a robot arm. The scene or current view of the environment via the camera may be explored to locate the object of interest. The goal of the exploration process is to move the manipulator and/or camera so as to find the object in the environment or scene (e.g., the object of interest in an image or within the field of view of the camera). In some aspects, the scene exploration may be conducted using random search techniques, coverage techniques, frontier-based exploration techniques and the like. When the object is recognized, a depth map may be computed based on camera images of the object. For example, the depth of the pixel in each of the images may be determined. The depth information or depth maps may in turn be used to determine an object map, which is a 3D reconstruction of the localized object.

The object map may be used to generate a planning graph. The planning graph may comprise a graph of candidate motions around the object to be grasped. A cost for each of the candidate motions may be determined. The candidate motion having the lowest cost may be selected and used to move the robot arm. As the robot arm is moved, additional images of the object may be captured and used to determine a subsequent movement or sequence of movements. Accordingly, a best or most efficient trajectory for grasping the object with the robotic arm may be determined based on the generated 3D object reconstruction.

FIG. 1 illustrates an example implementation for guiding a robot equipped with a camera to facilitate 3D reconstruction through sampling based planning using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for recognizing and localizing an object in a two-dimensional (2D) image. The instructions loaded into the general-purpose processor 102 may also comprise code for computing three dimensional (3D) depth maps for the localized object and constructing a 3D object map from the depth maps. Additionally, instructions loaded into the general-purpose processor 102 may comprise code for growing a sampling based structure around the 3D object map and assigning a cost to each edge of the sampling based structure. Furthermore, the instructions loaded into the general-purpose processor 102 may comprise code for searching the sampling based structure to determine a lowest cost sequence of edges and guiding the robot based on the search.

Figure 2:
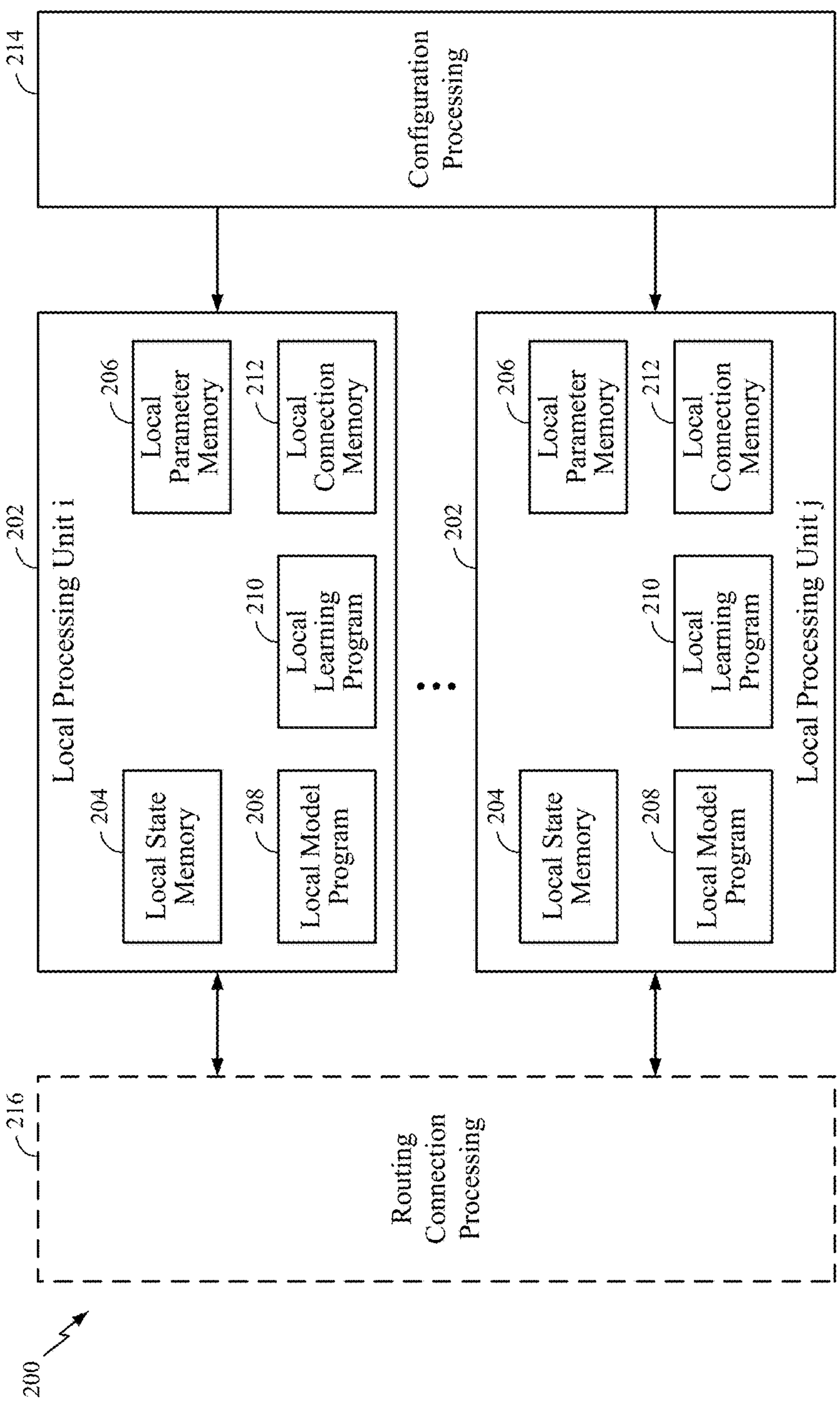
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
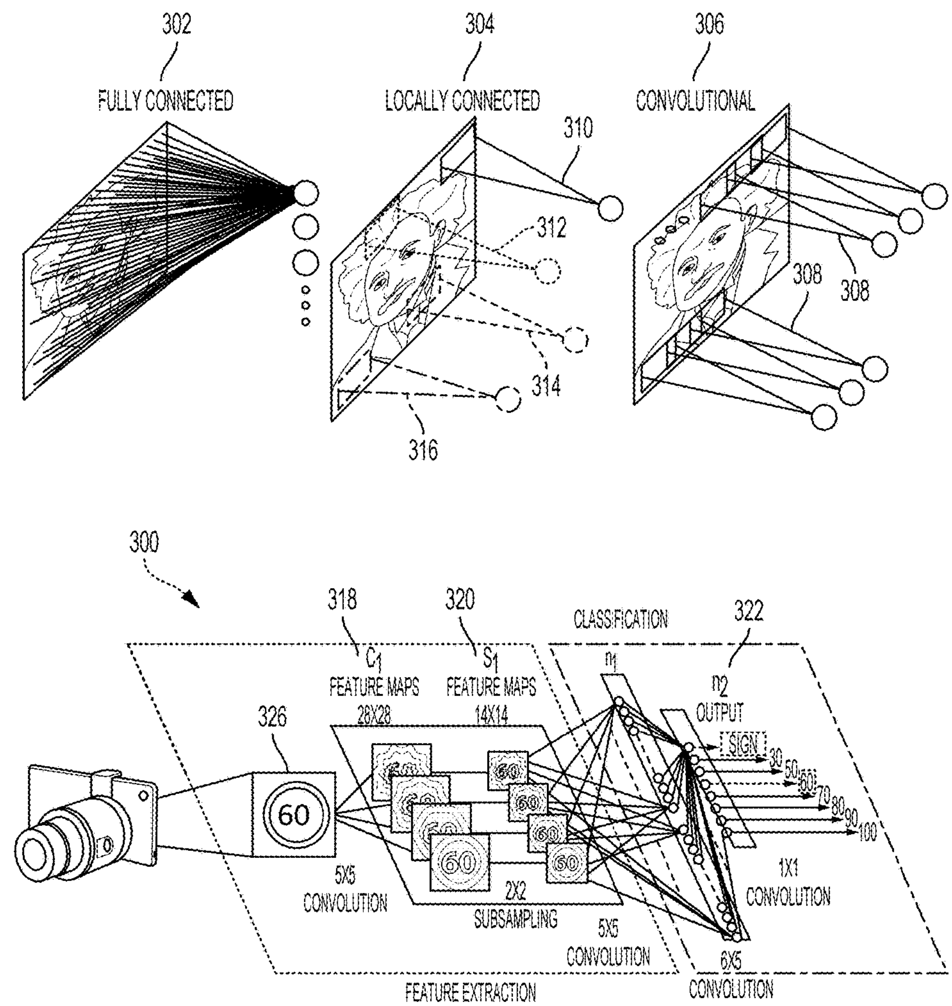
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
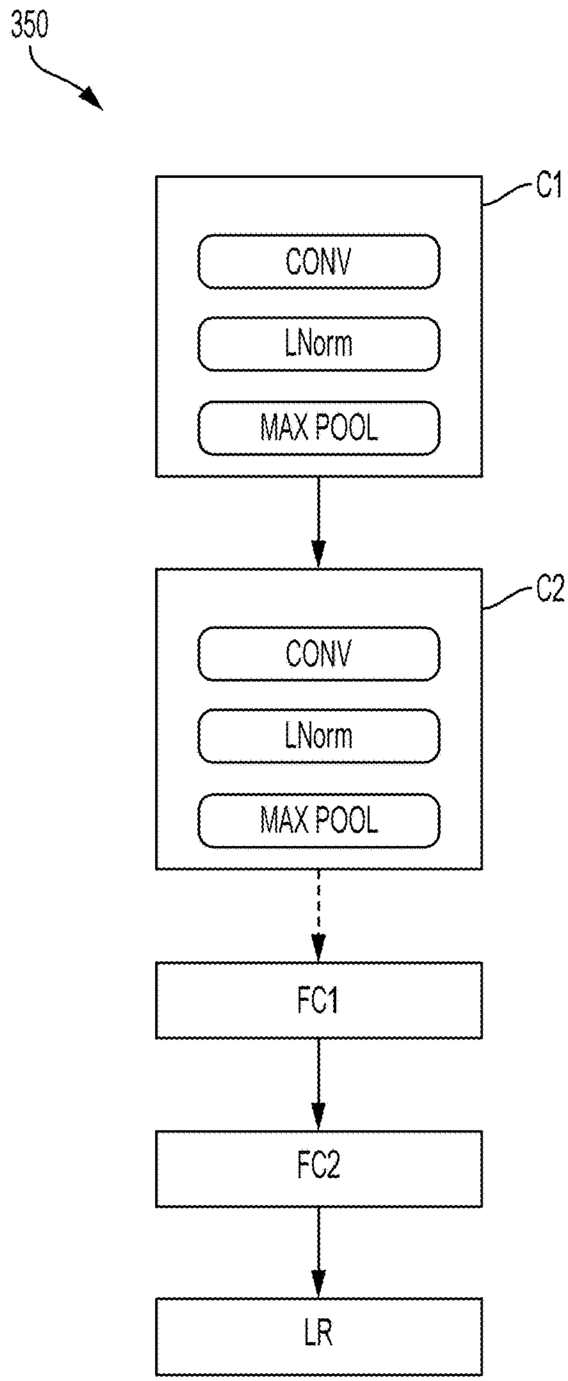
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
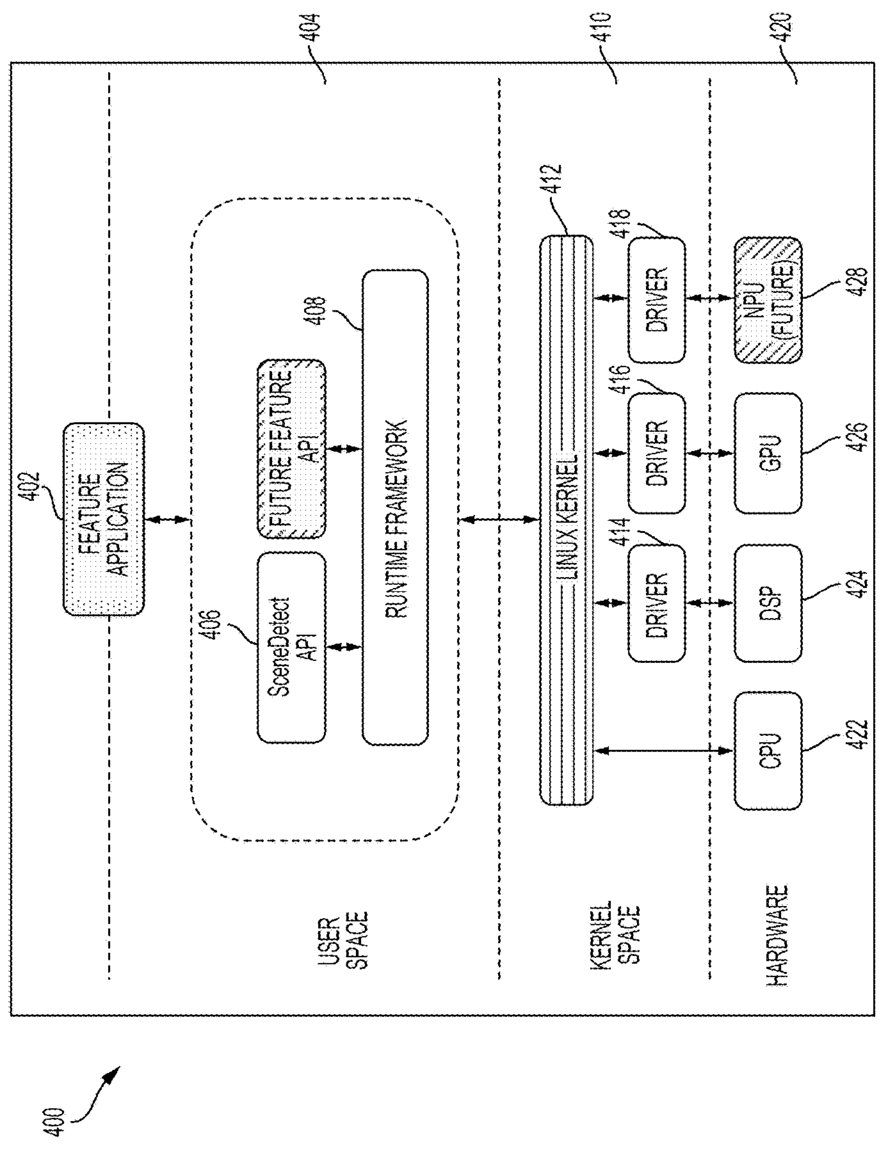
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
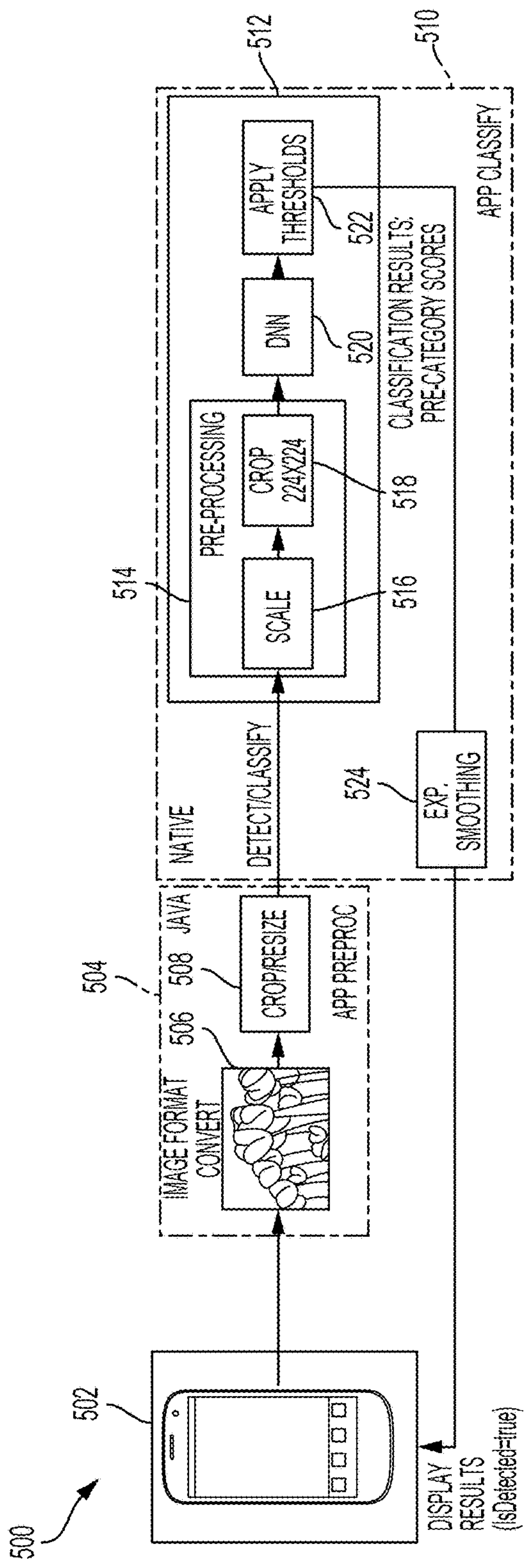
FIG. 5 is a block diagram illustrating the run-time operation of an artificial intelligence (AI) application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a machine learning model is configured for recognizing and localizing an object. The model is also configured for computing a plurality of depth maps for the localized object and for constructing an object map (3D construction of the localized object) from the depth maps. The model is further configured for growing a sampling based structure around the object map and assigning a cost to each edge of the sampling based structure. Furthermore, the model is configured for searching the sampling based structure to determine a lowest cost sequence of edges and for guiding the robot based on the search. The model includes means for recognizing and localizing, computing means, constructing means, growing means, assigning means, searching means and/or guiding means. In one aspect, the means for recognizing and localizing, computing means, constructing means, growing means, assigning means, searching means and/or guiding means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Figure 6:
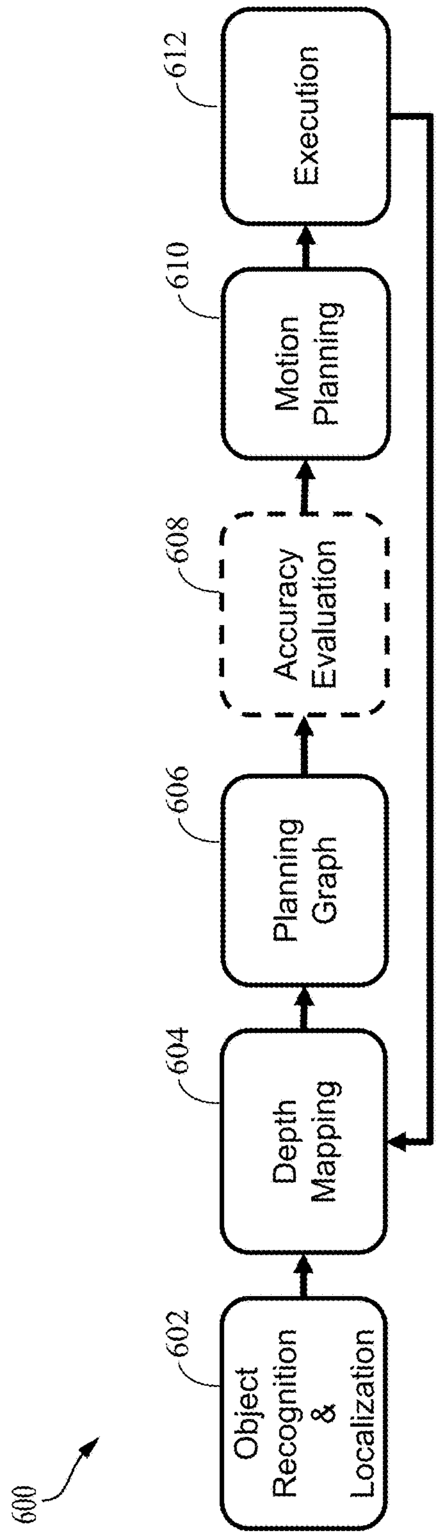
FIG. 6 is a block diagram illustrating a framework for 3D reconstruction in accordance with aspects of the present disclosure.

FIG. 6 is a block diagram illustrating a framework 600 for 3D reconstruction in accordance with aspects of the present disclosure. The framework may be used to produce a motion plan that facilitates 3D reconstruction of an object observed in a 2D image. The framework 600 includes an object recognition and localization unit 602, a depth mapping unit 604, a planning graph unit 606, a motion planning unit 610 and an execution unit 612. In some aspects, the framework may also include an accuracy evaluation unit 608, which may evaluate the accuracy of the object reconstruction.

The object recognition and localization unit 602 performs object localization in an image, for example, using deep learning techniques, to determine a region of interest in the image. As such, the framework 600 may focus on the determined region of interest to achieve a focused and efficient 3D reconstruction.

The object recognition and localization unit 602 may be configured to localize and recognize or identify an object in an image (e.g., the field of view of a camera). In some aspects, scene exploration may also be performed, for example, when the object of interest is not in the field of view. The scene exploration techniques may be employed to move the camera and/or agent to find the object of interest in the environment or scene. For instance, a scene may be explored using coverage or random techniques, frontier-based exploration or other exploration techniques. In one example, where the agent is a drone, the terrain of a region may be explored. Scene exploration may be performed to locate a landing area by controlling the camera to sweep the area below as the drone flies over the terrain.

In some aspects, an object-relation graph may also be used to enhance the scene exploration performance. The object-relation graph may incorporate knowledge regarding the object of interest to limit the region to be searched. For example, where the object being searched for is a cup, there is a higher probability that the cup is on a table, as opposed to on the floor. Accordingly, if a table is included in the image (or partially included), the object-relation graph may be used to adjust the scene exploration such that the top of the table is searched with a higher priority than under the table.

In some aspects, the object recognition and localization unit 602 may also be trained to recognize objects based on audible input. For example, upon receiving an audible input for the object of interest (e.g., a cup), the object recognition and localization unit 602 may retrieve images from an image repository corresponding to the word "cup".

When a candidate object is detected, object recognition techniques may be used to identify the candidate object. If the candidate object is not the object of interest for the scene exploration, the scene exploration may continue.

If the candidate object is the object of interest for the scene exploration (e.g., the object of interest is recognized in the field of view (or image)), object localization may be performed to determine the location of the object or part of the object in the image (e.g., a 2D image). Object localization techniques may be used to determine an estimate of the object location. In some aspects, a bounding box may be formed around the object. In doing so, the scale and location of the object may be determined. Based on this information and the location of the camera, control input may be determined to move the camera to better center the object within the bounding box.

In some aspects, lightweight localization may be achieved by finding the residuals in the power spectrum of an image. On the other hand, localization that is more robust may be achieved using deep learning techniques. For example, a DCN 350 (FIG. 3B) may learn features of image patches likely to include the object of interest. Using the more robust methods, the object may be located and then tracked rather than repeating localization procedures.

The framework may also include a depth mapping unit 604. The depth mapping unit 604 computes a dense depth map for the localized object. Having localized the object, depth information such as a depth estimate may be determined for each pixel corresponding to the object. Because the object has been localized, the depth estimates may be limited to relevant portions of the image (e.g., pixels within the bounding box area) rather than computing depth estimates for every pixel in the image. By focusing the depth computations in this manner, the framework 600 may enable reduction in power and memory consumption, as well as increased processing efficiency.

The depth estimate for each pixel corresponding to the object of interest may be used to generate a depth map for the object. The depth map may comprise a grid such as a three-dimensional grid, for example. The grid may be arranged based on the position of the pixels in the image and the corresponding depths or depth estimates. In some aspects, the position of the pixels and the corresponding depth information may be used to find a corresponding cell (or voxel) in the grid for each pixel in the image or identified portion. The pixel and its depth information may be stored in the corresponding cell of the grid. This process of finding a corresponding cell or voxel in the grid may be repeated for each of the cells over time to generate the depth map.

In one exemplary configuration, the camera may be positioned and/or coupled on or about the hand (e.g., palm) of the agent (e.g., robot). Of course, the number of cameras and placement of the camera with respect to the agent is merely exemplary and not limiting. Positioning the camera in the hand may improve depth inference. This is because the depth of a point is determined by observing the point from two different positions. The greater the distance between the two positions, the better the inference of the point depth. Accordingly, as compared to conventional approaches of using a humanoid robot in which the camera is placed on or about the head of the robot, a greater amount of displacement is possible with the camera positioned on or about the hand.

Additionally, scene exploration tasks may also be enhanced by positioning or coupling the camera on or about the hand of the agent (e.g., robot). That is, by moving the hand of the agent, the camera position may be changed to provide an increased range of vantage points from which to observe an environment or region. For instance, the hand of an agent may be raised to view a region from a position above the agent's head. In another example, the hand of an agent may be lowered such that areas underneath structures (e.g., a table) may be observed.

Figure 7A:
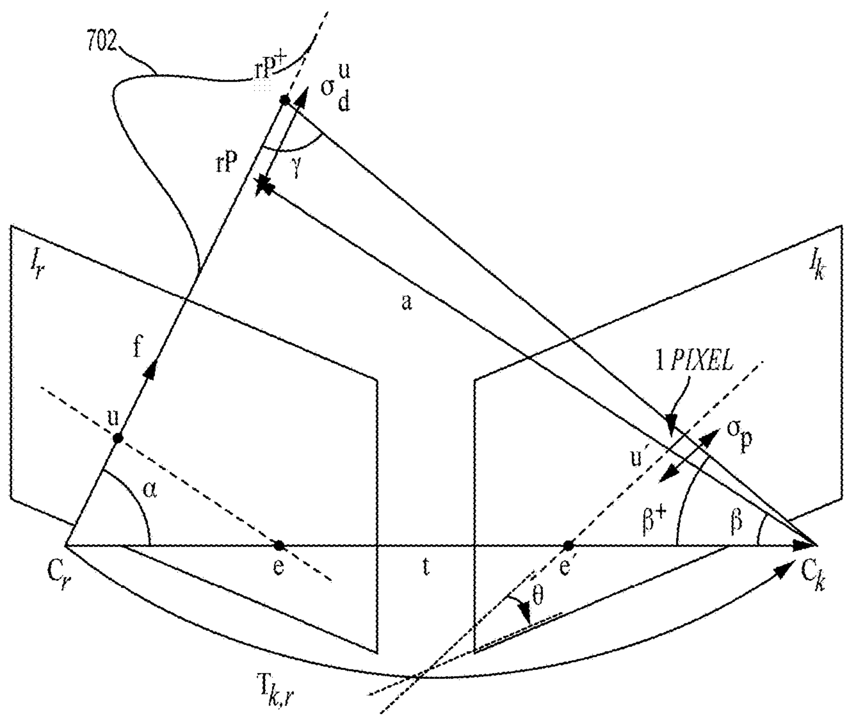
FIG. 7A is an exemplary diagram illustrating a pixel depth determination in accordance with aspects of the present disclosure.

FIG. 7A is an exemplary diagram illustrating a pixel depth determination in accordance with aspects of the present disclosure. The point rP (real location of point p) is observed from two locations (r, k) indicated by the center of the camera at the respective locations and denoted $C_r$ and $C_k$. A pixel u corresponding to the point p is shown on image planes ($I_r$ and $I_k$, respectively) for the camera at each location. An estimate of the pixel depth, which may correspond to the distance between the camera center $C_r$ and the point location (rP), may be determined.

In one example, an estimate of the pixel depth may be determined using a Kalman filter. The filter output may be in the form of a probability distribution function (PDF) (see element number 702) for the actual location of point p (rP) based on an estimated location (shown as $rP^+$). The variance of point p may be computed by back-projecting a constant variance (e.g., for one pixel). Using the peak of the PDF at the most likely location of point p, the distance camera center $C_r$ and the point location (rP).

In addition, the breadth or narrowness of the distribution may provide an indication of the confidence in the estimated pixel depth $rP^+$. That is, the wider the probability distribution, the greater the number of possible locations for point p. Thus, a relationship between pixel depth variance $\sigma_d^u = \|rP^+\| - \|rP\|$ and the trajectory between locations k and r ($T_{k,r}$) may be inferred. In the example of FIG. 7A, the pixel depth variance $\sigma_d^u$ may be computed in view of the following:

$$a = {}_r p - t \quad (1)$$

$$\alpha = \arccos\left(\frac{f \cdot t}{\|t\|}\right) \quad (2)$$

$$\beta = \arccos\left(-\frac{a \cdot t}{\|a\| \cdot \|t\|}\right) \quad (3)$$

$$\beta^+ = \beta + 2\tan^{-1}\left(\frac{\sigma_p}{2f}\right) \quad (4)$$

$$\gamma^+ = \pi - \alpha - \beta^+ \quad (5)$$

$$\|rP^+\| = \|t\| \frac{\sin\beta^+}{\sin\gamma^+} \quad (6)$$

where f (bolded) is a unit vector, f (unbolded) is a focal length, and $\sigma_p$ is the pixel matching uncertainty. The pixel matching uncertainty $\sigma_p$ may directly affect the pixel depth uncertainty $\sigma_d^u$. As illustrated in the example of FIG. 7A, a smaller pixel matching uncertainty $\sigma_p$ may result in a more narrow pixel depth uncertainty $\sigma_d^u$ and conversely, a larger pixel matching uncertainty $\sigma_p$ may result in a broader pixel depth uncertainty $\sigma_d^u$. Accordingly, locations for viewing or observing the point p may be selected such that the PDF is narrow, and in some cases, the most narrow.

In some aspects, the determined pixel depth and variance information may be supplied as feedback to the object recognition and localization unit 602 to improve object localization. For instance, the pixel depth and variance information may be used to reduce uncertainty with respect to and/or adjust the location of the bounding box enclosing the object of interest.

Figure 7B:
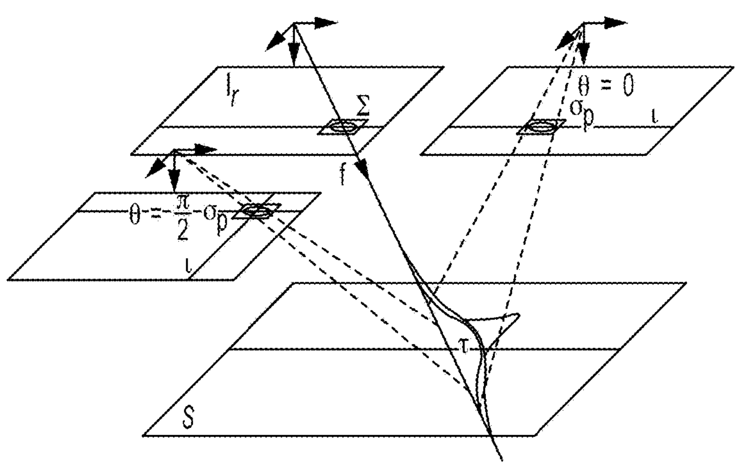
FIG. 7B is an exemplary diagram illustrating motion-dependent depth variance in accordance with aspects of the present disclosure.

FIG. 7B is an exemplary diagram illustrating motion-dependent depth variance in accordance with aspects of the present disclosure. As shown in FIG. 7B, three images are taken of a point in region S. Region S has a surface divided into two areas. The number of areas within the region is merely exemplary, for ease of illustration. The present disclosure is not so limiting and any number of areas may be included in the region.

The areas may comprise surfaces having different characteristics (e.g., color, texture, and/or topology). In one example, the areas may have a different color (e.g., black carpet and white carpet). In another example, the areas may have different textures (e.g., grass and concrete). As shown, in FIG. 7B, the motion of the camera from one position to the next may significantly affect the pixel depth variance. Here, moving the camera from a location producing the image plane $I_r$ to a location producing an image plane positioned at $$\theta = \frac{\pi}{2}$$

results in a smaller pixel depth variance than moving the camera to a location producing an image plane positioned at θ=0 (shown via more narrow PDF (τ)). Notably, FIG. 7B illustrates that moving the camera in two different directions may result in two different pixel depth variances and thus, two different amounts of information depending on the available texture in the environment.

Referring again to FIG. 6, the framework 600 may also include a planning graph unit 606. The planning graph unit 606 may be used to construct an object map or reconstruction based on the depth map. In some aspects, a 3D object map or 3D reconstruction of the 2D image may be generated.

The planning graph unit 606 may also construct and/or update a motion planning graph. The motion planning graph may be used to determine control inputs for controlling the agent to move about the object of interest to facilitate a 3D reconstruction. The planning graph may be grown incrementally around the object of interest. For example, points may be sampled in a given radius r around the current position of the camera. Each of the sampling points, which may be referred to as nodes, may be connected to its k-nearest neighbors on the graph. The connections may comprise one or more edges. An edge is a motion primitive that may denote a short trajectory or a small segment of motion (e.g., a few centimeters) for the camera. The edges may be concatenated to form the graph, which may be used for motion planning purposes. In this way, a sampling based motion planning framework may be incrementally created.

In some aspects, shape priors may also be used to aid the 3D reconstruction of the object of interest. That is, if there is some knowledge of the shape of the object of interest, the prior knowledge may be used as a starting point for constructing the planning graph. For example, sampling and connection of points in a motion library may be determined based on the prior knowledge of the object's shape. Similarly, the 3D reconstruction (e.g., object map) may also be determined based on the prior knowledge of the object's shape.

The motion planning unit 610 may determine a sequence of edges or connected nodes to form a potential plan for moving the camera and/or agent along a trajectory to positions from which to observe the object of interest and to facilitate a 3D reconstruction of the object. In some aspects, multiple potential motion plans may be generated. A potential motion plan may be selected based on a selection criteria. For instance, a potential plan may be selected based on the distance to the desired object (e.g., distance to grasp position of a teacup) or other metrics.

In some aspects, a potential plan may be selected according to a reconstruction metric. For example, the reconstruction may comprise an edge cost. The edge cost may be defined as the cost of moving the camera and/or agent along a particular edge of a potential motion plan. In one exemplary aspect, the edge cost or reconstruction reward may be determined based on the variance of pixel depth for each of the pixels in an image corresponding to the object of interest.

In this exemplary aspect, the standard deviation of the depth estimate corresponding to a pixel u of a reference image may be given by $\sigma_k^z$ at the k-th time step. A filter may be used to estimate an unknown (e.g., depth). In one exemplary aspect, the filter (e.g., Kalman filter) may filter along the edge to recursively compute the depth estimate. Accordingly, the covariance may evolve as:

$$P_{k+1}^- = AP_k^+A^T - GQG^T \quad (7)$$

$$P_{k+1}^+ = P_{k+1}^- - P_{k+1}^- H^T(HP_{k+1}^- + H^T + R)HP_{k+1}^- \quad (8)$$

where $P_{k+1}^-$ is the prediction, $P_{k+1}^+$ is the update of the variance at time step k+1, Q is the process noise, R is the measurement noise, A is the Jacobian of system kinematics (e.g., obtained from linearization) and H is the Jacobian of the sensor model (e.g., obtained from linearization). The filter output comprises a probability distribution of the mean and variance.

The filtering equations (7) and (8) may be rewritten to define an information matrix given by:

$$\Omega k=(P_k)^{-1} \tag{9}$$

The information may be added up along an edge as:

$$\Omega_{k+1}^{+}=\Omega_{k+1}^{-}+\Omega_{k+1}^{z} \tag{10}$$

where $\Omega_{k+1}^{z}$ is information corresponding to a measurement z (e.g., pixel depth). Because information ($\Omega_k$) is inversely proportional to the variance, the smaller the variance the more information that is provided. As such, each pixel of the object of interest may add to the information regarding the object of interest. Furthermore, each observation (e.g., image) via the camera may add to the information regarding the object of interest.

Accordingly, the cost of the (i,j)th edge may be defined as the sum of information gains along the edge as expressed by:

$$C^{ij}=\sum_{t=0}^{N}\sum_{z\in BB}\Omega_t^z \tag{11}$$

where BB is the bounding box around the object in the reference frame and N is the length of the edge. According to equation (11), the cost function may be focused to consider the information for pixels along an edge that lies within the bounding box around the object of interest in the reference frame.

Using the cost metric, it may be more desirable to select a motion path along an edge that produces the greater reward (e.g., the most information). That is, by moving the camera along a trajectory that leads to increased information (and lower pixel depth variance), more accurate 3D reconstructions of the 2D image of the object of interest may be achieved. In addition, the 3D reconstructions may be performed in a more efficient manner. As such, the approaches of the present disclosure may beneficially reduce power consumption and improve processing efficiency.

In some aspects, a weighted reward or cost may be used. The weighted cost may be given by:

$$C^{ij}=\sum_{z\in BB}\sum_{t=0}^{N}w_t^z\Omega_t^z \tag{12}$$

where $w_t^z$ is a weight for the information of measurement z (e.g., pixel depth). For example, in a grasping application, where the agent is tasked with grasping a cup, edges along the handle of the cup may be weighted less than edges along the bowl-shaped reservoir.

In some aspects, the cost (reward) may vary in relation to the pixel depth variance. Where the measurement is modeled as pixel depth, the weighted edge cost may be expressed as:

$$C^{ij}=\sum_{z\in BB}\sum_{t=0}^{N}\frac{w_t^z}{\sigma_{d,t}^u} \tag{13}$$

where $\sigma_{d,t}^u$ is the pixel depth variance as a function of the distance between camera locations.

In some aspects, a keyframe or reference frame may be fixed at each node of the planning graph. Keyframes may also be fixed at each edge. In this case, the keyframes may serve as or play the role of the reference frames for the edge extending out of (e.g., outgoing from) that keyframe's node. In this case, when an edge is determined to be too long, the edge may be broken into two edges. If the keyframes are limited to nodes, the image overlap may be considered when sampling nodes and connecting edges. For example, if the image overlap at the start and end of an edge is not sufficient for an accurate 3D reconstruction of the object, the edge may be discarded. Alternatively, the edge may be broken again. In some aspects, the graph nodes may be adjusted or updated based on the suitability of the keyframes (e.g., based on motion blur, percentage of available features).

The information gain and reconstruction uncertainty along each edge may be determined and evaluated. Using the cost function (e.g., $C^{ij}$) as a planning metric, the planning graph may be searched to determine the best sequence of edges along which to move the camera. The motion planning unit 610 may, in turn generate a control input, which may be executed by the execution unit 612 to move the agent and/or camera according to the determined sequence of edges. In some aspects, the motion planning unit 610 may generate a control input to move the agent and/or camera only along the first edge in the sequence of edges. As the camera is moved along the trajectory of the edges, the procedure may be repeated. For example, the depth map and object map may be updated. The planning graph and motion plan may also be updated.

Referring again to FIG. 6, in some aspects, the framework 600 may also include an accuracy evaluation unit 608. The accuracy evaluation unit 608 may evaluate the accuracy of the 3D reconstruction. For example, given a ground truth for the pixel depth, a reconstruction error may be determined. In some aspects, the reconstruction error may be used to determine an updated motion plan for moving the camera and/or agent.

The framework 600 may further include a planning graph unit 606 to construct and/or update a motion planning graph. The graph may be grown incrementally around the object of interest. For example, points may be sampled in a given radius r around the current position of the camera. Each of the sampling points, which may be referred to as nodes, may be connected to it k-nearest neighbors on the graph. The connections may comprise an edge or motion primitive. A sequence of the connected nodes may form a potential plan for moving the camera or a trajectory to positions from which to observe the object of interest to facilitate a 3D reconstruction of the object.

Figure 7C:
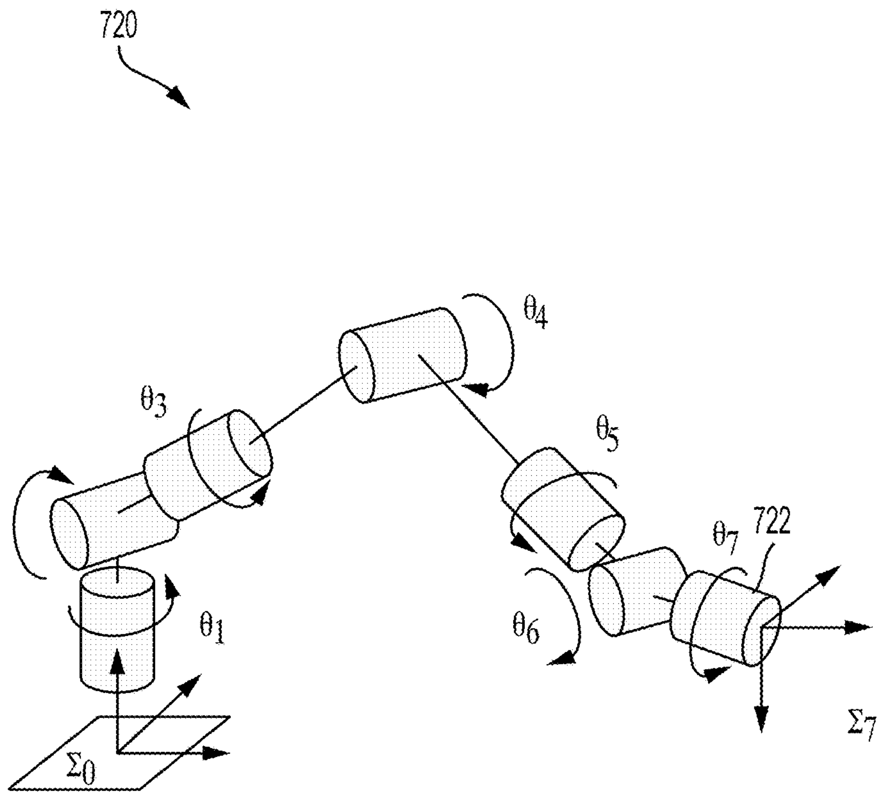
FIG. 7C illustrates an exemplary manipulator in accordance with aspects of the present disclosure.

In one illustrative example, the camera may be provided with a manipulator (shown as element 720 in FIG. 7C). The manipulator 720 comprises a set of joints (revolute or prismatic) and a camera (not shown), which may be positioned or coupled on or about the end effector 722. In this configuration, an inverse kinematics model (IK) for the robotic manipulator may be computed to determine the joint parameters that provide a desired position of the end-effector. That is, the inverse kinematics may transform the motion plan into joint actuator trajectories for the robot (e.g., mapping 3D space (camera position) into joint angle space) as follows:

$$\begin{pmatrix}\theta_1\\ \theta_1\\ \vdots\\ \theta_n\end{pmatrix}=IK\begin{pmatrix}x\\ y\\ z\\ \text{roll}\\ \text{pitch}\\ \text{yaw}\end{pmatrix} \tag{14}$$

A library of motions (e.g., camera trajectories) may be generated by sampling points around the end-effector and connecting the points by open-loop trajectories (e.g., straight lines). The corresponding control action (e.g., actuator commands) may be computed by transforming the camera position to the joint space using inverse kinematics. As the camera moves according to the computed control action, a planning graph may be grown to represent the manipulator's workspace around the object of interest.

In some aspects, multiple potential motion plans may be generated. A potential motion plan may be selected based on a selection criteria. For instance, a potential plan may be selected based on the distance to the desired object (e.g., distance to grasp position of a teacup) or other metrics.

In some aspects, a potential plan may be selected according to a reconstruction metric. A keyframe or reference frame may be at each node on the graph. The information gain and reconstruction uncertainty along each edge may be determined and evaluated.

Figure 8:
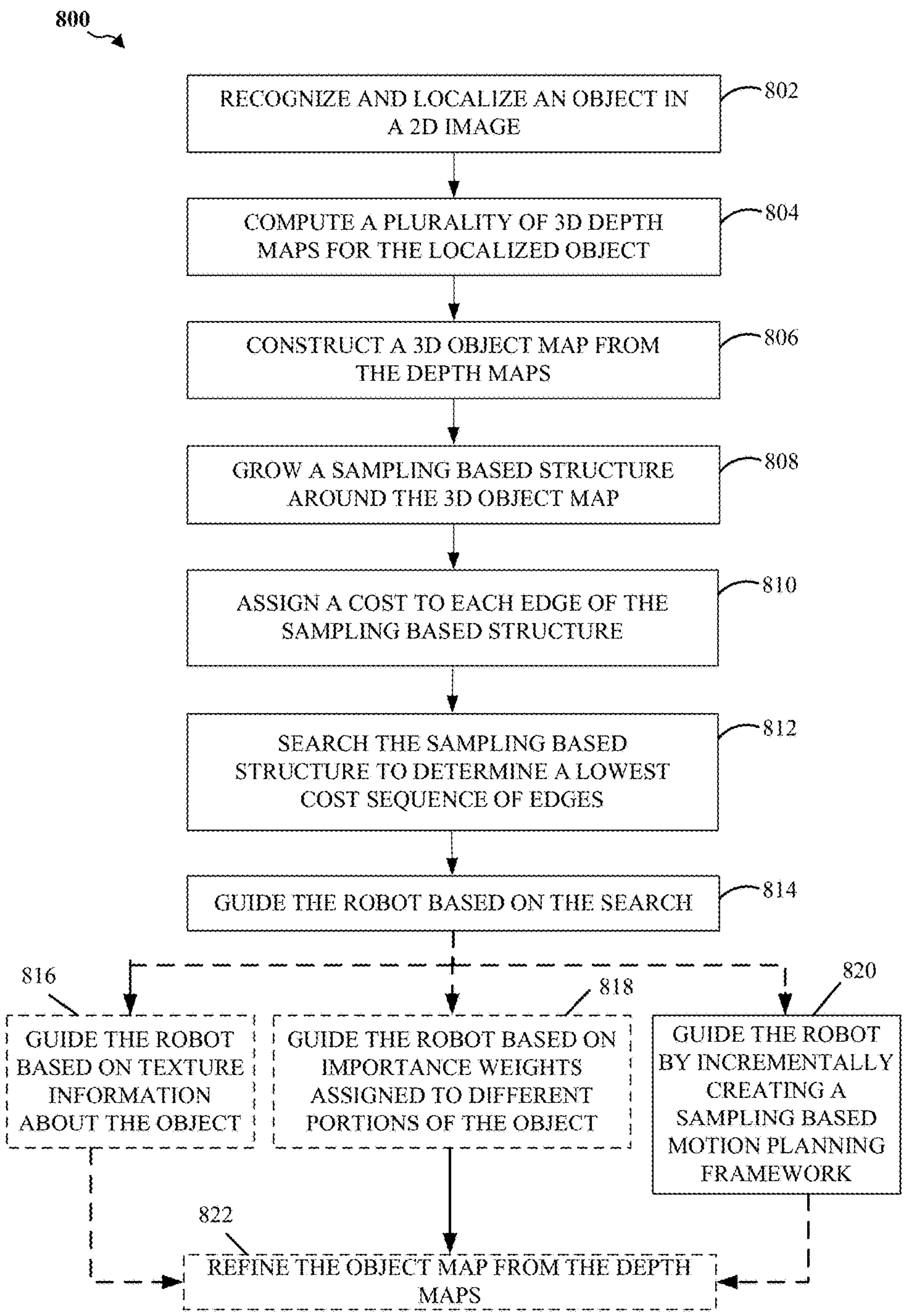
FIG. 8 illustrates a method for guiding a robot equipped with a camera to facilitate 3D reconstruction according to aspects of the present disclosure.

FIG. 8 illustrates a method 800 for guiding a robot equipped with a camera to facilitate 3D reconstruction. In some aspects, multiple cameras may be used to provide multi-view stereo vision. Additionally, in some exemplary configurations, the camera may be placed in an end of an extremity closest to the object.

In block 802, the process recognizes and localizes an object in a 2D image (2D localizing). In some aspects, the recognizing and localizing may be object focused. In other aspects, the recognizing and localizing may be limited according to a bounding box around the object. Furthermore, the 2D localizing may be based on deep learning techniques (e.g., the DCN 350 may learn features of image patches likely to include the object of interest).

In block 804, the process computes 3D depth maps for the localized object. The depth maps may be computed based on the depth of the pixel in each image of the object of interest. In block 806, the process constructs a 3D object map from the depth maps.

In block 808, the process grows a sampling based structure around the 3D object map. The sampling based structure may comprise edges or motion primitives that correspond to a short trajectory for the camera (and/or robot arm). In block 810, the process assigns a cost to each edge of the sampling based structure. In block 812, the process searches the sampling based structure to determine a lowest cost sequence of edges (or sequence with the greatest reward). Furthermore, in block 814, the process guides the robot based on the search.

In some aspects, the process may optionally guide the robot based on texture information about the object, in block 816. In one example, the texture information may comprise information regarding the terrain or topology of a region, which may be used to determine a landing area for a drone. In another example, the texture information may comprise information regarding the presence of a floor covering such as carpet.

In some aspects, the process may optionally guide the robot based on importance weights assigned to different portions of the object, in block 818. For example, where the object is to grasp a teacup, the handle may be assigned a greater weight than that of the bowl/reservoir of the cup.

In some aspects, the process may optionally guide the robot by incrementally creating a sampling based motion planning framework, in block 820.

In some aspects, the process may optionally refine the object map from the depth maps, in block 822. Additional depth maps may also be computed using further or additional images of the object. the additional depth maps may in turn be used to further refine the object maps.

In some aspects, the process may quantify obtained information about 3D structure for use as a cost in motion planning.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

In some aspects, method 800 may be performed by the SOC 100 (FIG. 1) or the system 200 (FIG. 2). That is, each of the elements of method 800 may, for example, but without limitation, be performed by the SOC 100 or the system 200 or one or more processors (e.g., CPU 102 and local processing unit 202) and/or other components included therein.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for guiding a robot equipped with a camera to facilitate three-dimensional (3D) reconstruction through sampling based planning, comprising:
- identifying an object of interest;
- searching for the object of interest in an environment comprising a plurality of objects;
- recognizing and localizing the object of interest in a plurality of two-dimensional (2D) images of the environment captured via the camera;
- constructing a 3D object map based on the localized object in the plurality of 2D images, a depth variance associated with pixels of the 3D object map;
- growing a sampling based structure around the 3D object map;
- assigning a cost to each edge of the sampling based structure based on the depth variance of pixels visible along a given edge;
- searching the sampling based structure to determine a lowest cost sequence of edges; and
- guiding the robot through the environment based on the lowest cost sequence of edges.

2. The method of claim 1, further comprising:
- computing a plurality of 3D depth maps for the localized object based on the plurality of 2D images; and
- constructing the 3D object map from the plurality of 3D depth maps.

3. The method of claim 1, further comprising guiding the robot through the environment based on texture information of the object of interest.

4. The method of claim 1, further comprising guiding the robot through the environment based on importance weights assigned to different portions of the object of interest.

5. The method of claim 1, further comprising guiding the robot through the environment by incrementally creating a sampling based motion planning framework.

6. An apparatus for guiding a robot equipped with a camera to facilitate three-dimensional (3D) reconstruction through sampling based planning, comprising:
- a memory; and
- at least one processor coupled to the memory, the at least one processor configured:
  - to identify an object of interest;
  - to search for the object of interest in an environment comprising a plurality of objects;
  - to recognize and localize the object of interest in a plurality of two-dimensional (2D) images of the environment captured via the camera;
  - to construct a 3D object map based on the localized object in the plurality of 2D images, a depth variance associated with pixels of the 3D object map;
  - to grow a sampling based structure around the 3D object map;
  - to assign a cost to each edge of the sampling based structure based on the depth variance of pixels visible along a given edge;
  - to search the sampling based structure to determine a lowest cost sequence of edges; and
  - to guide the robot through the environment based on the lowest cost sequence of edges.

7. The apparatus of claim 6, in which the at least one processor is further configured:
- to compute a plurality of 3D depth maps for the localized object based on the plurality of 2D images; and
- to construct the 3D object map from the plurality of 3D depth maps.

8. The apparatus of claim 6, in which the at least one processor is further configured to guide the robot through the environment based on texture information of the object of interest.

9. The apparatus of claim 6, in which the at least one processor is further configured to guide the robot through the environment based on importance weights assigned to different portions of the object of interest.

10. The apparatus of claim 6, in which the at least one processor is further configured to guide the robot through the environment by incrementally creating a sampling based motion planning framework.

11. An apparatus for guiding a robot equipped with a camera to facilitate three-dimensional (3D) reconstruction through sampling based planning, comprising:
- means for identifying an object of interest;
- means for searching for the object of interest in an environment comprising a plurality of objects;
- means for recognizing and localizing the object of interest in a plurality of two-dimensional (2D) images of the environment captured via the camera;
- means for constructing a 3D object map based on the localized object in the plurality of 2D images, a depth variance associated with pixels of the 3D object map;
- means for growing a sampling based structure around the 3D object map;

means for assigning a cost to each edge of the sampling based structure based on the depth variance of pixels visible along a given edge;

means for searching the sampling based structure to determine a lowest cost sequence of edges; and means for guiding the robot through the environment based on the lowest cost sequence of edges.

12. The apparatus of claim 11, further comprising:

means for computing a plurality of 3D depth maps for the localized object based on the plurality of 2D images; and means for constructing the 3D object map from the plurality of 3D depth maps.

13. The apparatus of claim 11, further comprising means for guiding the robot through the environment based on texture information of the object of interest.

14. The apparatus of claim 11, further comprising means for guiding the robot through the environment based on importance weights assigned to different portions of the object of interest.

15. The apparatus of claim 11, further comprising means for guiding the robot through the environment by incrementally creating a sampling based motion planning framework.

16. A non-transitory computer readable medium having encoded thereon program code for guiding a robot equipped with a camera to facilitate three-dimensional (3D) reconstruction through sampling based planning, the program code executed by a processor and comprising:

program code to identify an object of interest;

program code to search for the object of interest in the environment comprising a plurality of objects;

program code to recognize and localize the object of interest in a plurality of two-dimensional (2D) images of the environment captured via the camera;

program code to construct a 3D object map based on the localized object in the plurality of 2D images, a depth variance associated with pixels of the 3D object map;

program code to grow a sampling based structure around the 3D object map;

program code to assign a cost to each edge of the sampling based structure based on the depth variance of pixels visible along a given edge;

program code to search the sampling based structure to determine a lowest cost sequence of edges; and program code to guide the robot through the environment based on the lowest cost sequence of edges.

17. The non-transitory computer readable medium of claim 16, further comprising:

program code to compute a plurality of 3D depth maps for the localized object based on the plurality of 2D images; and program code to construct the 3D object map from the plurality of 3D depth maps.

18. The non-transitory computer readable medium of claim 16, further comprising program code to guide the robot through the environment based on texture information of the object of interest.

19. The non-transitory computer readable medium of claim 16, further comprising program code to guide the robot through the environment based on importance weights assigned to different portions of the object of interest.

20. The non-transitory computer readable medium of claim 16, further comprising program code to guide the robot through the environment by incrementally creating a sampling based motion planning framework.

* * * * *